US011807189B2

(12) United States Patent
Kay et al.

(10) Patent No.: US 11,807,189 B2
(45) Date of Patent: Nov. 7, 2023

(54) QUICK DISCONNECT FOR DETACHABLE STAIR SYSTEM

(71) Applicant: TORK LIFT INTERNATIONAL, INC., Kent, WA (US)

(72) Inventors: Jack Kay, Kent, WA (US); Chad A Winslow, Kent, WA (US)

(73) Assignee: TORK LIFT INTERNATIONAL, INC., Kent, WA (US)

(*) Notice: Subject to any disclaimer, the term of this patent is extended or adjusted under 35 U.S.C. 154(b) by 0 days.

(21) Appl. No.: 17/710,560

(22) Filed: Mar. 31, 2022

(65) Prior Publication Data

US 2022/0219613 A1    Jul. 14, 2022

Related U.S. Application Data

(62) Division of application No. 16/878,435, filed on May 19, 2020, now Pat. No. 11,292,391.

(60) Provisional application No. 62/910,628, filed on Oct. 4, 2019, provisional application No. 62/850,531, filed on May 20, 2019.

(51) Int. Cl.
*B60R 3/02* (2006.01)
*B60R 3/00* (2006.01)

(52) U.S. Cl.
CPC .............. *B60R 3/02* (2013.01); *B60R 3/007* (2013.01)

(58) Field of Classification Search
CPC .............. B60R 3/007; B60R 3/02; E06C 5/24
See application file for complete search history.

(56) References Cited

U.S. PATENT DOCUMENTS

| 2,050,593 | A | * | 8/1936 | Traut | E06C 1/54 |
| | | | | | 182/98 |
| 2,487,921 | A | | 11/1949 | Culver | |
| 3,180,451 | A | * | 4/1965 | Patterson | E06C 1/54 |
| | | | | | 182/106 |
| 3,394,947 | A | | 7/1968 | Strube, Sr. | |
| 3,462,170 | A | | 8/1969 | Smith | |

(Continued)

FOREIGN PATENT DOCUMENTS

| CA | 3081170 A1 | * | 11/2020 | ............. B60R 3/007 |
| CA | 3081170 A1 | | 11/2020 | |

*Primary Examiner* — Jeffrey J Restifo
(74) *Attorney, Agent, or Firm* — R. Reams Goodloe, Jr.

(57) ABSTRACT

A quick disconnect mechanism for a detachable stair system for vehicles. The apparatus includes mounting brackets for installation at either side of a doorway in a recreational vehicle such as motorhome, camping trailer, or camper on a pickup truck. Fixed plates in the form of open jaw brackets are provided at each side of a sill cover plate, to enable operation of a pivotable detachable stair portion. The open jaw of the fixed plates are pivotable about pivot studs located in the mounting brackets. The fixed plates further include an arcuate channel defined radially outward from the pivots studs. The arcuate slot is sized and shaped for engagement with a pivot lock also located on the mounting brackets. The pivot locks extend inward for sliding operation with the arcuate slot, but not so far inward as to interfere with the pivoting motion of the sill cover plate. A slide latch is provided, with a latch tongue sized and shaped for interfitting mating engagement in a latch slot located one or both of the mounting brackets,to secure the detachable stair portion when the stairs are not being used.

11 Claims, 9 Drawing Sheets

(56) References Cited

U.S. PATENT DOCUMENTS

| | | | |
|---|---|---|---|
| 3,610,658 A | 10/1971 | Sartori | |
| 3,756,622 A | 9/1973 | Pyle et al. | |
| 3,807,757 A * | 4/1974 | Carpenter | B60R 3/02 |
| | | | 182/95 |
| 3,858,905 A | 1/1975 | Peebles | |
| 4,623,160 A | 11/1986 | Trudell | |
| 4,720,116 A | 1/1988 | Williams | |
| 5,005,850 A | 4/1991 | Baughman | |
| 5,039,119 A | 8/1991 | Baughman | |
| 5,311,965 A | 5/1994 | Wu | |
| 5,505,476 A * | 4/1996 | Maccabee | B60R 3/02 |
| | | | 280/166 |
| 5,547,040 A * | 8/1996 | Hanser | B60R 3/02 |
| | | | 182/127 |
| 5,584,493 A * | 12/1996 | Demski | B60R 3/02 |
| | | | 105/445 |
| 5,803,475 A * | 9/1998 | Dick | B60R 3/007 |
| | | | 280/166 |
| 5,941,342 A * | 8/1999 | Lee | B60R 3/02 |
| | | | 182/95 |
| 5,957,237 A | 9/1999 | Tigner | |
| 6,082,751 A * | 7/2000 | Hanes | B60R 3/02 |
| | | | 280/169 |
| 6,213,486 B1 * | 4/2001 | Kunz | B60R 3/02 |
| | | | 280/166 |
| 6,435,616 B1 | 8/2002 | Travis et al. | |
| 6,659,224 B2 * | 12/2003 | Medsker | E06C 5/04 |
| | | | 182/127 |
| 7,677,584 B2 * | 3/2010 | Raley | E06C 1/387 |
| | | | 182/127 |
| 7,857,337 B2 * | 12/2010 | Ferguson | B60R 3/02 |
| | | | 182/127 |
| 8,246,063 B1 * | 8/2012 | Rowland | B60R 3/02 |
| | | | 280/166 |
| 8,251,178 B2 * | 8/2012 | Krobot | B60R 3/02 |
| | | | 182/127 |
| 8,678,411 B2 | 3/2014 | Kibler | |
| 9,010,473 B1 * | 4/2015 | Rasmussen | B60R 3/02 |
| | | | 180/166 |
| 9,308,869 B1 * | 4/2016 | Owens, Jr. | E04G 1/28 |
| 9,527,448 B1 * | 12/2016 | Kay | E06C 5/28 |
| 9,617,788 B2 * | 4/2017 | Goodson | E06C 1/005 |
| 9,945,179 B1 * | 4/2018 | Joldersma | E06C 5/02 |
| 9,981,608 B1 * | 5/2018 | DoVale | B60D 1/58 |
| 10,099,622 B2 * | 10/2018 | Handschke | B60R 3/02 |
| 2008/0157500 A1 | 7/2008 | Raley | |
| 2009/0189365 A1 * | 7/2009 | Ferguson | B60R 3/02 |
| | | | 280/166 |
| 2010/0051387 A1 * | 3/2010 | Krobot | E06C 1/58 |
| | | | 182/158 |
| 2011/0140389 A1 * | 6/2011 | Ellement | E06C 5/28 |
| | | | 280/166 |
| 2013/0193667 A1 | 8/2013 | Ellement | |
| 2015/0097353 A1 * | 4/2015 | Rasmussen | B60R 3/02 |
| | | | 280/166 |
| 2017/0267181 A1 * | 9/2017 | Hoffman | B60R 3/007 |
| 2019/0176707 A1 * | 6/2019 | Liao | B60R 3/02 |
| 2019/0351832 A1 * | 11/2019 | Fuller | E06C 5/36 |
| 2020/0369210 A1 * | 11/2020 | Kay | B60R 3/02 |
| 2020/0369211 A1 * | 11/2020 | Kay | B60R 3/02 |
| 2020/0399099 A1 * | 12/2020 | Tanimoto | E06C 7/48 |

* cited by examiner

QUICK DISCONNECT FOR DETACHABLE STAIR SYSTEM

RELATED PATENT APPLICATIONS

This is a divisional application and claims priority under 35 USC § 121 of U.S. patent application Ser. No. 16/878,435 filed May 19, 2020, which matures into U.S. Pat. No. 11,292,391 on Apr. 5, 2022. That application claimed priority under 35 USC. § 119(e) from U.S. Provisional Patent Application Ser. No. 62/910,628 filed Oct. 4, 2019, entitled QUICK DISCONNECT FOR DETACHABLE STAIR SYSTEM. U.S. patent application Ser. No. 16/878,435 also claimed the benefit of priority from U.S. Provisional Patent Application Ser. No. 62/850,531, filed May 20, 2019, entitled RETRACTABLE STAIR SYSTEM. U.S. patent application Ser. No. 16/878,435 additionally cross-referenced and incorporated by reference U.S. Non-Provisional patent application Ser. No. 16/878,404, filed May 19, 2020, entitled RETRACTABLE STAIR SYSTEM.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to adjustable stairs, and in particular, to adjustable stairs configured for use with driven or towed vehicles, and especially, motor homes and recreational vehicles, including campers on pickup trucks, or on towed campers, or the like.

BACKGROUND

A continuing need exists for improvements in stair systems for use in accessing a variety of driven or towed vehicles. Often, vehicles of various types park at locations where an entrance door or platform is at a level above the ground where ease and/or safety of access to the vehicle would be facilitated by the availability of a stair system. Further, quite often a vehicle may be parked over sloping or uneven ground, so placement of legs on the ground, for support or stability, is often problematic in prior art designs of which we are aware. A wide variety of stair structures have been known and utilized as appropriate for various applications. And, although many of such prior art stair structures have been constructed which in some limited fashion enable a user to effect or provide some adjustment in the stairs, at least in the case of campers used on pickup trucks, adjustment is generally only with respect to extension from the camper. Thus, often a separate stool, block of wood, or other structure is necessary for placement on the ground in order to provide a reasonable height for users to access many prior art stair designs for campers.

A common problem encountered in prior art stair systems is that such stairs often are provided as a part of a structure, similar to an outward opening door on an aircraft, which leaves the stair system in place, even when not in use, and after it has been folded or retracted. Alternately, in many prior art designs the stairs become permanently affixed to a doorway opening when installed, so that they are always in the doorway, whether in use or folded up. Thus, such prior art stair structures inevitably interfere from time to time with the full use and enjoyment of the doorway area just interior to the doorway in a vehicle, e.g., the doorway of a camper trailer, or the entry/exit door provided on a pickup truck camper.

A previous retractable stair system design owned by the applicant herein, namely Torklift International, Inc. provided some advantages over various prior art stair systems for vehicles, and such details were disclosed in prior U.S. Pat. No. 9,527,448 B1, issued to Jack KAY and Joel CRAWFORD, on Dec. 27, 2016, entitled RETRACTABLE STAIR SYSTEM WITH PRECISION ELEVATION CONTROL. The disclosure of the just mentioned patent is incorporated herein in its entirety, including the specification, drawing, and claims, by this reference.

Nevertheless, there remains a continuing and unmet need for a detachable stair system which may be quickly and easily installed in, and quickly and easily removed from, a vehicle doorway. It would be advantageous, especially in vehicles such as in a camper in which a stair system is mounted, that the stairs are easily deployed, and easily removed, for out-of-the-way storage when not in use. It would be particularly advantageous if the weight of the detachable stairs allowed easy extension for use, removal when not in use, and installation when use is desired, by a single adult without resort to tools or lifting devices.

Some Objects, Advantages, and Novel Features

An objective of our invention is to provide a design for a detachable stair system in which it is easy for user to install and remove the stairs, without the necessity of use of lifting devices or tools of various sorts.

Another objective of our invention is to provide a design for a detachable stair system in which the support pad distance below the bottom step is individually adjustable, to accommodate uneven ground at either side of the step.

Another important objective is to provide a quickly removable detachable stair portion in a detachable stair system which is easily and rapidly adjustable in total stair height, yet retains the ability to evenly space the height between individual stair steps.

Another important objective is to provide a detachable stair system in which the stairs are sturdy and of high strength, especially when quickly removable and easily portable.

Yet another important objective is to provide a compact detachable stair system structure and mounting hardware design in which the stairs may be neatly and securely stowed inside the vehicle when not in use, for example when the vehicle is in service over the road.

Finally, another important objective is to provide a compact detachable stair system structure and mounting hardware design in which the stairs may be easily and quickly installed in existing or new vehicles, and may be easily and quickly removed for storage.

SUMMARY

We have now invented a detachable stair system for vehicles which provides for easy removal and stowage of stairs when not in use, and which provides convenient, easy installation of stairs when they need to be deployed for use in a vehicle. This is important since it enhances ease of use of the doorway space in a vehicle (i.e. minimizes lost space occupied by a permanently mounted stair system), and thus increases the ease of access to and from a vehicle (e.g., a camper mounted on the back of a pickup truck) when the use of stairs is not needed or desired. Moreover, the design provides for a quick pivot disconnect structure for ease of deployment and ease of removal, so that the detachable stair system can be easily and quickly installed by or removed by a user, without the necessity for tools.

In various embodiments, a quick disconnect for a detachable stair system as disclosed herein may include four major components. These major components are (a) a pair of mounting brackets for use at a first and second side of a doorway in a vehicle for pivotally deploying a detachable stair portion in a detachable stair system, each of the mounting brackets including an inwardly extending pivot stud for pivotally supporting a detachable stair system, (b) a sill cover plate, (c) a pair of open jaw brackets affixed to the ends of the sill cover plate, wherein the open jaw of each of the brackets is sized and shaped for secure pivotable motion about the pivot studs, and (d) a latch assembly, the latch mounted on a stair assembly and configured for movement into and out of a latch slot on one or more of the mounting brackets. The latch assembly may be a manually adjustable latching system, configured for locking the extensible-retractable scissors stair assembly in a closed position in a vehicle doorway. In an embodiment, a manually deployable locking tab and receiving slot system may be used, where a sliding locking tab is adjustably locatable into or out of one or more latch holes configured as a receiving slot in a mounting bracket, so that when the manually deployable locking tab is adjusted, the locking tab can be configured for secure interfitting engagement with the edges of the receiving slot. In this manner, a latch at one or both sides of the stairs may secure a detachable stair portion in a stowed position, when desired.

Moreover, the quick disconnect for detachable stair system described herein, after initial installation of mounting brackets, needs no tools, or extra or loose parts, bolts, or other components for on-site assembly, installation, use, or removal. Resultantly, the pivotably deployable quick disconnect for detachable stair system disclosed herein is easy to use, since all necessary components are already on board and readily available.

BRIEF DESCRIPTION OF THE DRAWING

The present invention(s) are fully described herein by way of exemplary embodiments, using for illustration the accompanying drawing in which like reference numerals denote like elements in the various figures of the drawing, and in which.

Figure 1:
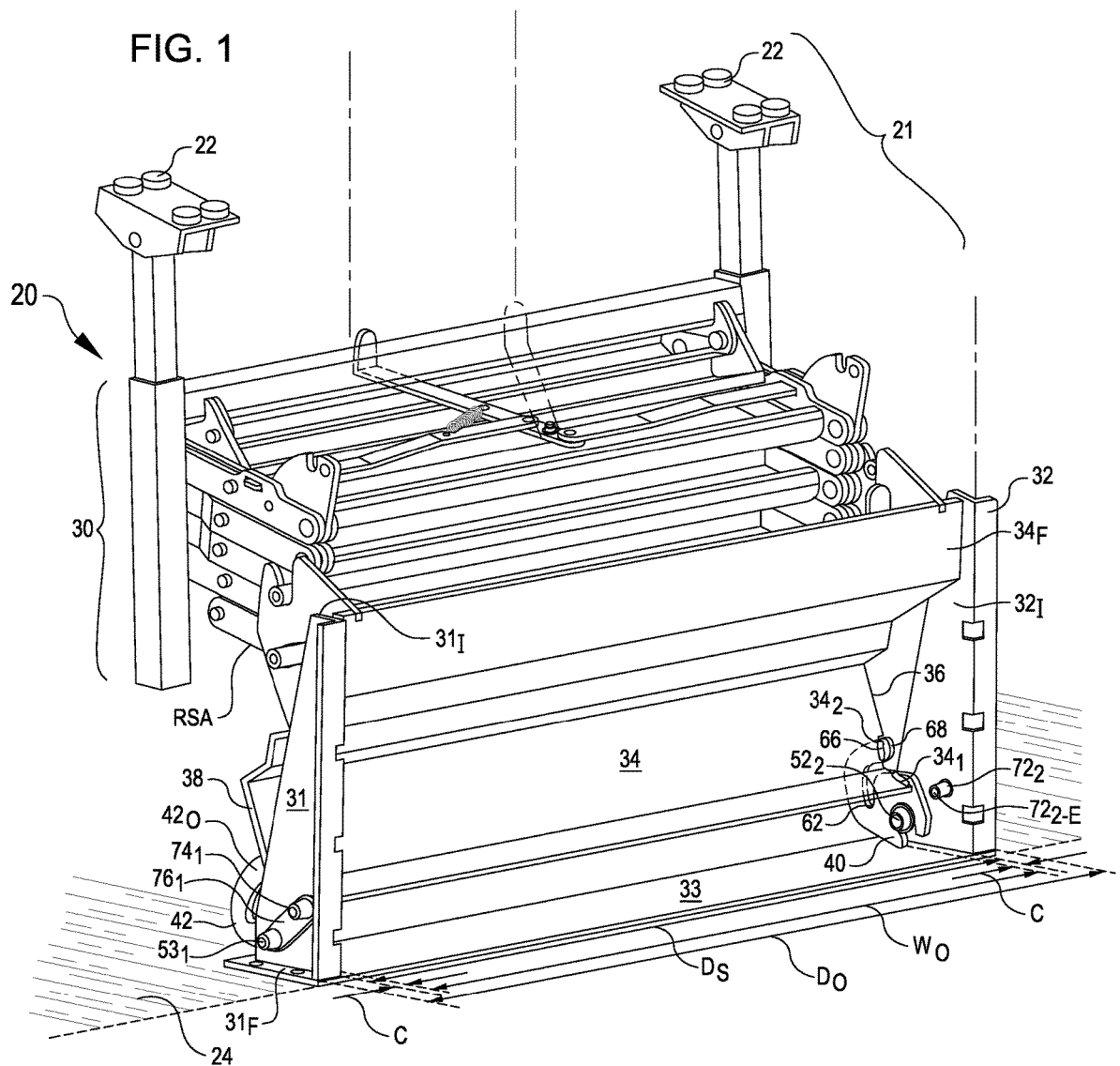
FIG. 1 is a perspective view of an embodiment for a pivotably stowable detachable stair system, in a fully retracted configuration, and having a quick disconnect pivot mechanism, showing mounting brackets for mounting in a doorway, and showing one of a pair of open jaw brackets affixed to the ends of a sill cover plate, wherein the open jaw of each one of the open jaw brackets is sized and shaped for secure pivotable motion about pivot studs provided on the mounting brackets.

The foregoing figures, being merely exemplary, contain various elements that may be present or omitted from a final configuration for an embodiment of a quick disconnect apparatus for a detachable stair system, where quick disconnect brackets are pivotably mounted to pivot studs extending inwardly from left and right mounting brackets. Other variations in quick disconnect components for detachable stair systems for vehicles may use other mechanical structures, mechanical arrangements, or size and shape of components, and yet employ the principles described herein and as generally depicted in the drawing figures provided, and as more specifically called out in the claims set forth below. In particular, although various dimensions may be utilized by those of skill in the art to make and use the claimed invention, and there is no intention to limit the claimed invention to dimensional data, any of which is exemplary rather than mandatory. Thus, quick disconnect components for a detachable stair system may be provided which is sized up or down from any dimensions depicted, without affecting the scope of the appended claims. An attempt has been made to draw the figures in a way that illustrates at least those elements that are significant for an understanding of exemplary quick disconnect apparatus for detachable stair systems which may be used in various types of vehicles.

It should be understood that various features may be utilized in accord with the teachings hereof, as may be useful in different embodiments as useful for various sizes and shapes of quick disconnect components for detachable stair systems for vehicles, depending upon the specific requirements (such as typical height of the bottom of a vehicle door above a road, or doorway dimensions, or vehicle door sill configuration) within the scope and coverage of the teachings herein as defined by the claims. Further, like features in various embodiments for a quick disconnect apparatus for detachable stair systems may be described using like reference numerals, or other like references, without further mention thereof.

DETAILED DESCRIPTION

Figure 5:
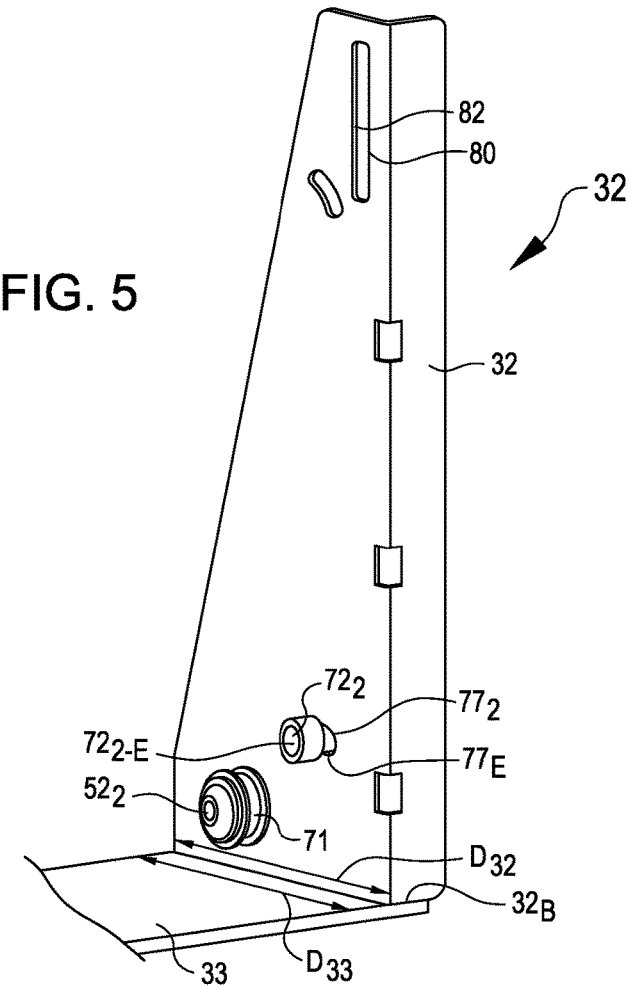
FIG. 5 is a perspective view of the inside of the right side mounting bracket, showing the locking tab receiving slot at the top, and the pivot stud for supporting the right end open jaw bracket, and the locking stud for interfitting sliding engagement with and sliding containment in the arcuate slot in the open jaw bracket.
Figure 6:
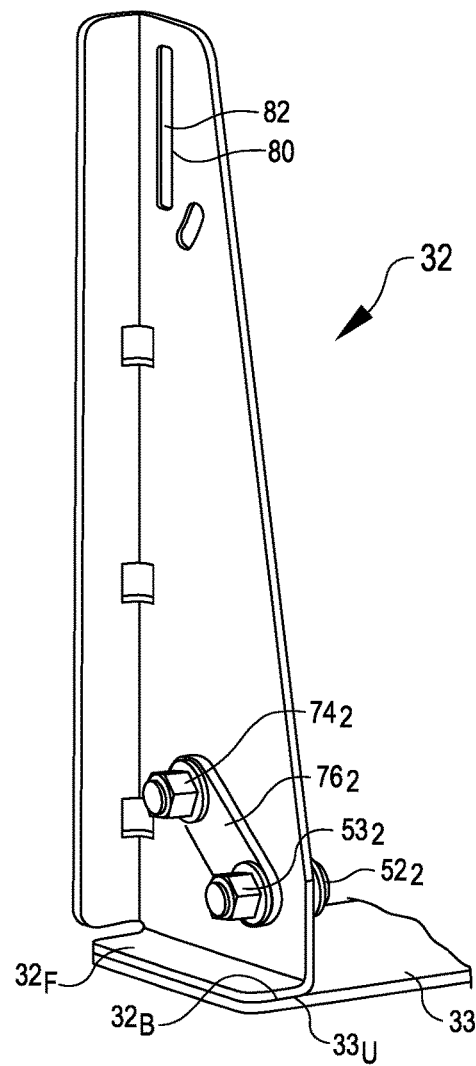
FIG. 6 is a perspective view of the outside of the right side mounting bracket, showing a locking tab receiving slot at the top, and the mounting hardware for the pivot stud for supporting the right end open jaw bracket, and the mounting hardware for the locking stud.

Attention is directed to FIG. 1, which provides a perspective view of a detachable stair system 20, with a detachable stair portion 21 (also see FIG. 3) in an inverted position with feet 22 pointing upward, as if mounted above floor 24 in a recreational vehicle doorway (doorway details not shown). In various embodiments, a recreational vehicle doorway may have a left side door frame adjacent the left side mounting bracket 31. Similarly, a right side door frame may be provided adjacent the right side mounting bracket 32. As illustrated in FIG. 1, the detachable stair portion 21 includes a retractable stair assembly RSA which is folded into a compact position 30 for storage. In this position, the detachable stair portion 21 is pivotally supported between the left side mounting bracket 31 and the right side mounting bracket 32. In an embodiment, the detachable stair portion 21 may include most or all components other than bracket 31, bracket 32, a floor plate 33 which extends between bracket 31 and bracket 32, and the pivot studs, mounting hardware, and adjustment hardware on the brackets 31 and 32, all of which is further discussed below. The floor plate 33 may be affixed to (e.g. by using fasteners), or integrally provided with (e.g. by welding or mechanical interlock), and located between the left side mounting bracket 31 and the right side mounting bracket 32. As seen in FIG. 6, in an embodiment, the bottom $32_B$ of mounting bracket 32 is affixed to an upper surface $33_U$ of the floor plate 33. As seen in FIG. 5, a floor plate 33 may be provided having a depth $D_{33}$. In an embodiment the depth $D_{32}$ of bracket 32 may be the same as the depth $D_{33}$ of floor plate 33. In an embodiment, as seen in FIG. 1, the overall width of floor plate 33 may be sized as the overall width Do available for mounting the detachable stair system 20 in a recreational vehicle. For standard recreational vehicle doorway widths, it has been found convenient to provide floor plates 33 having an overall width Do of about twenty three and seven sixteenths of an inch (23 7/16") for narrow doors, and about twenty seven and seven sixteenths of an inch (27 7/16") for wider doors. Importantly, the use of a floor plate 33 simplifies installation, and thus reduces installation time, and may also avoid or at least minimize the use of intrusive fasteners otherwise necessary in order to securely place the detachable stair system 20 in the doorway of a recreational vehicle.

In an embodiment, the detachable stair portion 21 may be latched (details below) to the right mounting bracket 32. A sill cover plate 34 is provided, having a right end 36 and a left end 38. The sill cover plate 34 may have a sill cover plate base $34_B$ that is configured to be deployed in a substantially horizontal configuration when the detachable stair assembly RSA is in use (see FIGS. 4 and 12) so that a door of a recreational vehicle (e.g. trailer door, pickup camper door, or motorhome door, not shown) may be closed above the sill cover plate 34. Additionally, the sill cover plate 34 may include additional panels, such as panels $34_A$, $34_C$ $34_D$, and $34_E$, and $34_F$ in the configuration depicted in FIGS. 1 and 4. In an embodiment, a sill cover plate 34 may be sized, shaped, and structurally suited for support of a right end pivot bracket, such as the right end open jaw bracket 40 and for support of a left end pivot bracket, such as the left end open jaw bracket 42.

Figure 4:
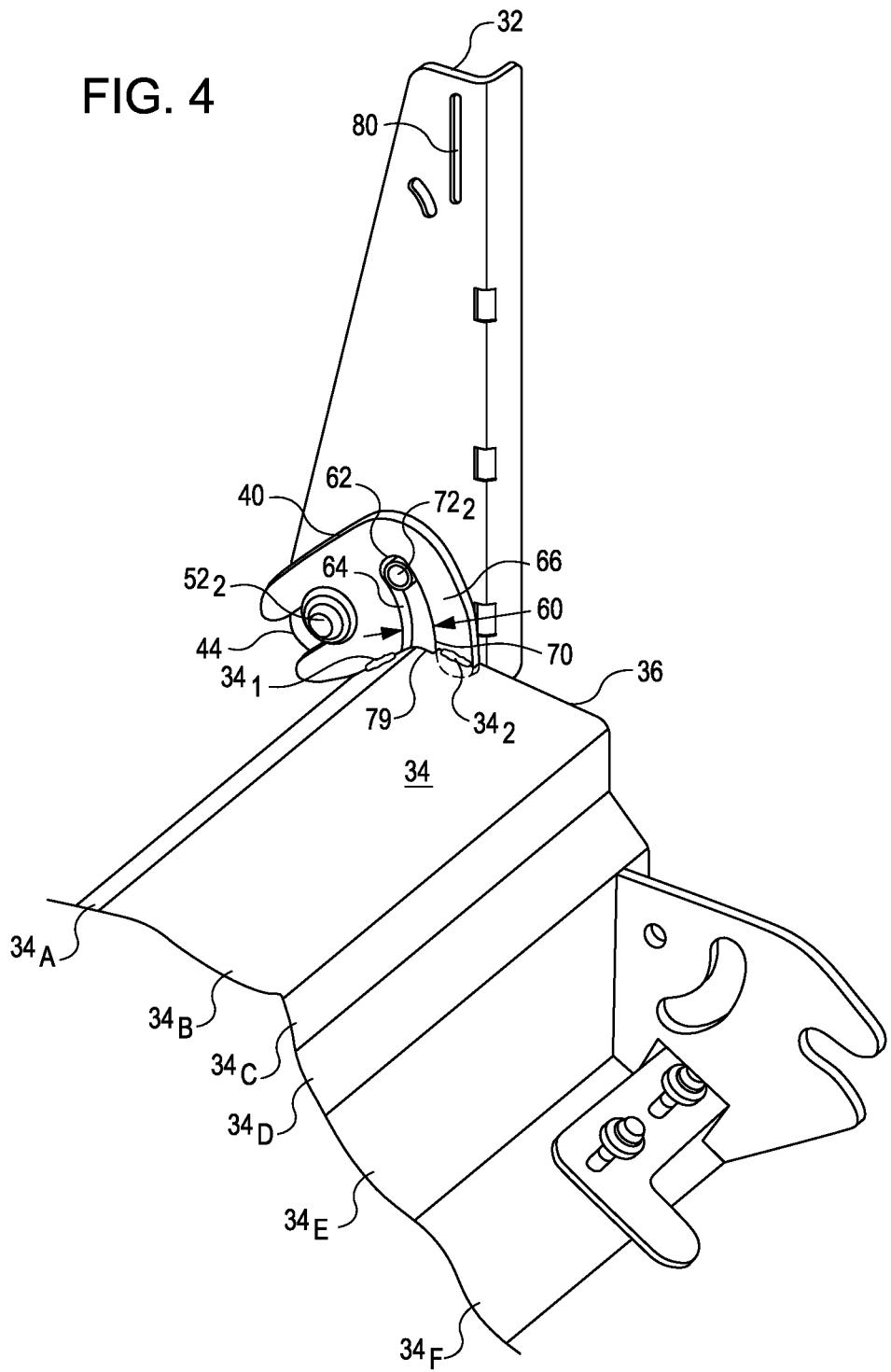
FIG. 4 is a partial perspective view of the right side mounting bracket, and the locking tab in the unlocked position, showing one of the open jaw brackets affixed to the right end of the sill cover plate, wherein the open jaw of the right end open jaw bracket is engaged with the right side pivot stud, showing how the right end open jaw bracket is sized and shaped for secure pivotable motion about the right side pivot stud, and wherein the detachable stairs have been pivoted outwardly and downwardly toward a working position, wherein the sill cover plate is substantially horizontal in position, and also showing an arcuate slot provided to engage a locking stud, and where the arcuate slot has a proximal, closed end and a distal, open end, with the arcuate slot defined between a curved base edge and the inner edge of a curved finger that extends outwardly from the open jaw bracket, and wherein the arcuate slot is sized and shaped for secure sliding engagement therein of the locking stud.
Figure 12:
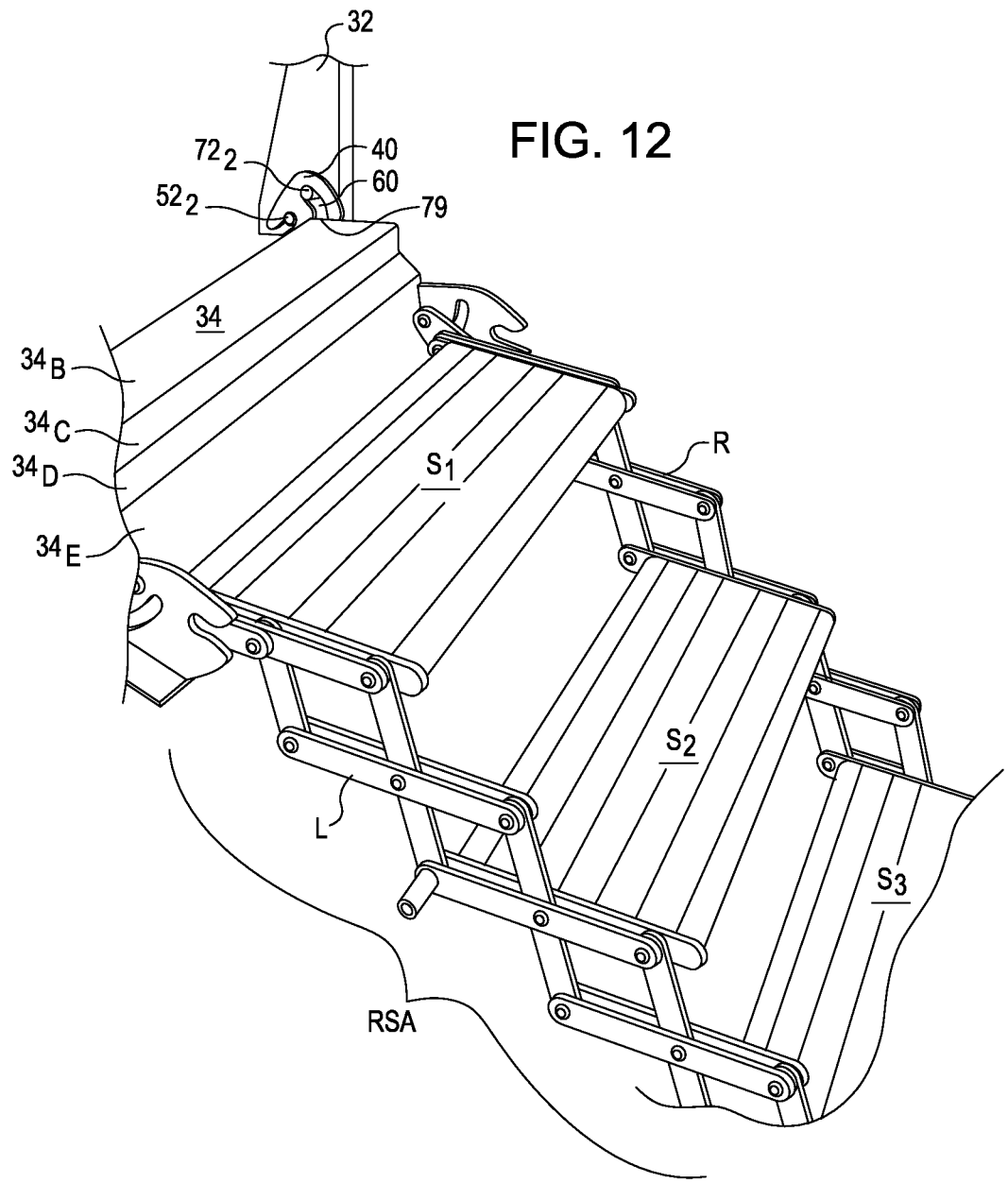
FIG. 12 is a perspective view of a detachable stair system in use, showing the right end open jaw bracket in place on the right side pivot stud, and showing the sill cover plate in a substantially horizontal position, so that a door of the vehicle may be closed over the sill cover plate, and with the stairs extended outward and downward into an operating position, ready for use.

When a quick disconnect mechanism is used, as described herein, a right end open jaw bracket 40 and a left end open jaw bracket 42 (in an embodiment, a mirror image of right end open jaw bracket 40) are provided. The right end open jaw bracket 40 may be affixed to the right end 36 of the sill cover plate 34, and the left end open jaw bracket 42 may be affixed to the left end 38 of the sill cover plate 34. In an embodiment, the right end open jaw bracket 40 (and mirror image left end open jaw bracket 42) may be affixed to panels $34_A$ and $34_B$ of the sill cover plate 34. In order to facilitate a suitable clearance for pivoting motion, the sill cover plate 34 may include cutout portions $34_Z$ in the ends of sill cover plate adjacent the right end and left end open jaw brackets 40 and 42. In an embodiment, cutouts $34_Z$ may be provided in the thickness of the right end and left end open jaw brackets 40 and 42. In an embodiment, the right end open jaw bracket 40 (and mirror image left end open jaw bracket 42) may be affixed to panels $34_A$ and $34_B$ of the sill cover plate 34 via welds $34_1$ and $34_2$, as seen in FIG. 4. In any event, the right end open jaw bracket 40 (and mirror image left end open jaw bracket 42) are operably connected to the retractable stair assembly RSA in a manner that the retractable stair assembly RSA may be placed into a stairs deployed condition as indicated in FIG. 12, or alternately placed into a retracted positon as seen in FIG. 1.

Figure 2:
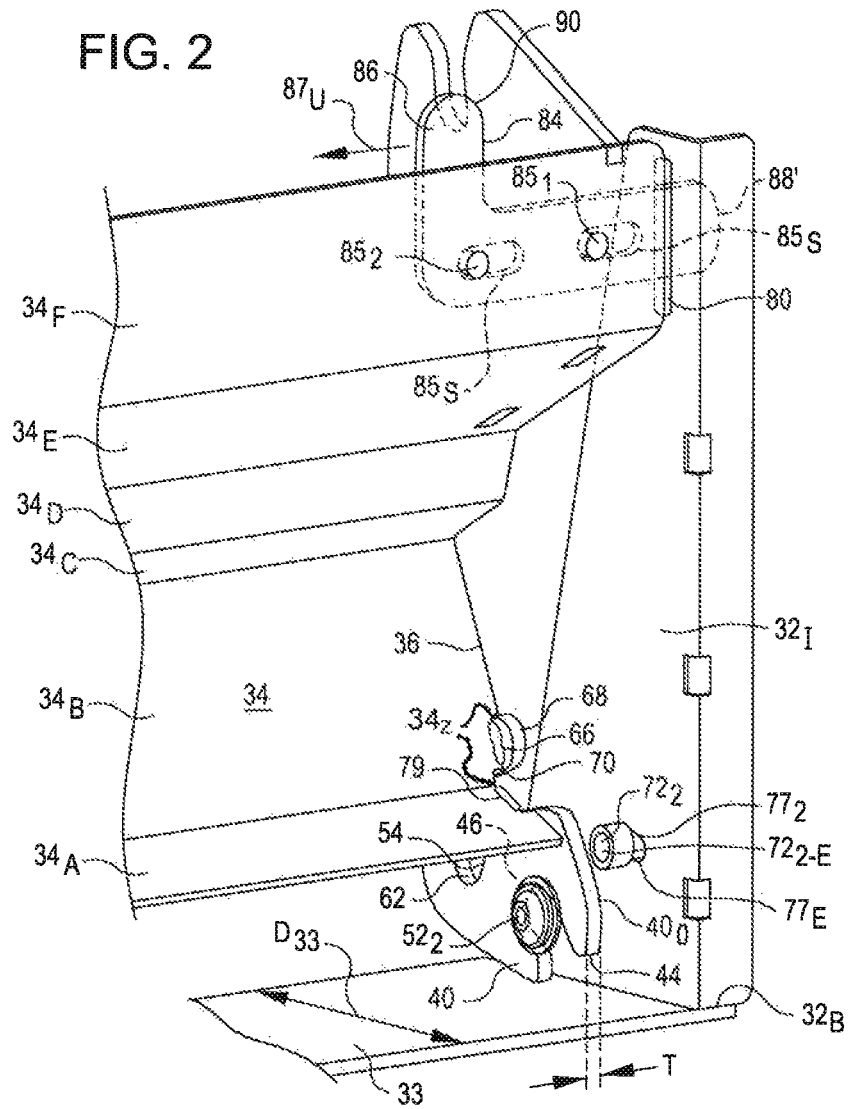
FIG. 2 is a partial perspective view of the right side mounting bracket, showing one of the open jaw brackets affixed to an end of the sill cover plate, wherein the open jaw of the right end open jaw bracket is engaged with the right side pivot stud, showing how the right end open jaw bracket is sized and shaped for secure pivotable motion about the right side pivot stud, and wherein a latch tab in the latch assembly is engaged with latch hole in a mounting bracket.

As better seen in FIG. 2, in an embodiment, the right end open jaw bracket 40 (and mirror image left end open jaw bracket 42) may be provided as a fixed plate having a thickness T. In various embodiments, thickness T may be about one-quarter inch (¼"). In an embodiment, the thickness T may be in the range of from about 0.20 inches to about 0.30 inches. As may be appreciated from FIG. 3, in an embodiment, each of the fixed plates that provide right and left end open jaw brackets 40 and 42 may include a pivot end 44 in which a generally U-shaped pivot stud receiver 46 is defined by an interior sidewall 48 having a proximal end 50. The pivot stud receiver 46 in left end open jaw bracket 42 may be sized and shaped for interfitting pivotal engagement with a pivot stud $52_1$ on the left side mounting bracket 31. Similarly, the pivot stud receiver 46 in right end open jaw bracket 40 may be sized and shaped for interfitting pivotal engagement with a pivot stud $52_2$ on the right side mounting bracket 32. In an embodiment, a left side mounting bracket 31 (see FIG. 6) may be provided as a mirror image of the right side mounting bracket 32 that was just illustrated in FIG. 5, and vice versa.

In an embodiment, the right end open jaw bracket 40 and the left end open jaw bracket 42 may each further include an arcuate shaped guide slot 60, which is spaced radially outwardly from the center of rotation of right end and left end open jaw brackets 40 and 42 about pivot studs $52_1$ and $52_2$ respectively. The guide slot 60 may include a proximal end 62 and a curved opening extending away therefrom. The arcuate shaped guide slot 60 may thus be defined between an interior guide slot edge 64 and an extending finger 66 reaching out to a distal end 68 and having an inside edge 70.

Figure 3:
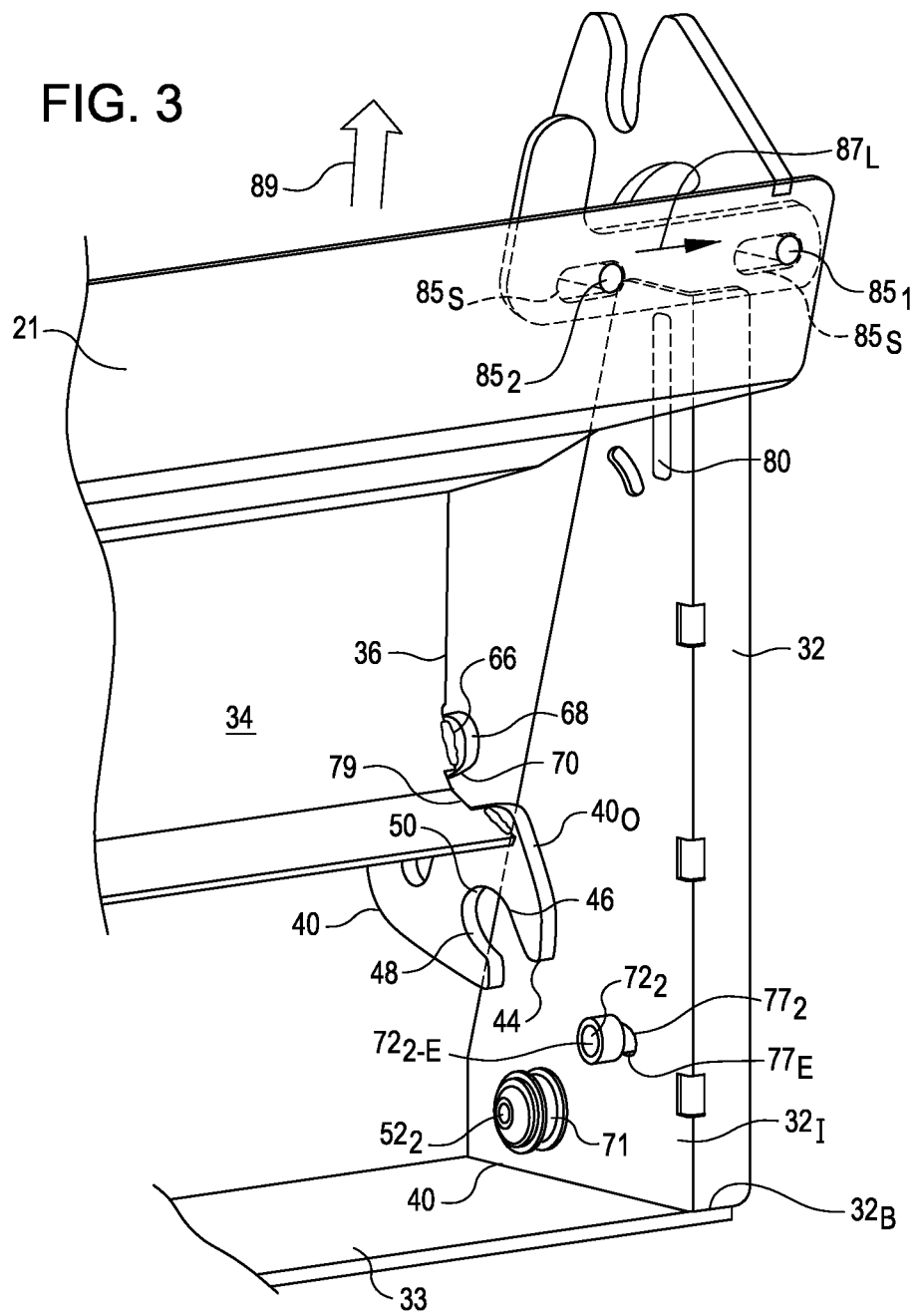
FIG. 3 is a partial perspective view of the right side of the detachable stair system, similar to the view just depicted in FIG. 2, but now showing the right side mounting bracket with the right end open jaw bracket disengaged from the right side pivot stud, and wherein the latch has been disengaged from the right side mounting bracket, as occurs when the stairs are removed for storage.

As seen in FIG. 1, the left side mounting bracket 31 is configured for location at and/or attachment to a left side frame of a doorway (not shown). Similarly, the right side mounting bracket 32 is configured for location at and/or attachment to a right side frame of a doorway. The left mounting bracket 31 includes a left pivot stud $52_1$. The right side mounting bracket 32 includes a right pivot stud $52_2$. As noted above, the right end open jaw bracket 40 and the left end open jaw bracket 42 are sized and shaped for interfitting pivotal engagement with and pivoting movement about the left pivot stud $52_1$ and the right pivot stud $52_2$, respectively. As shown in FIGS. 3 and 5, in an embodiment, the left pivot stud $52_1$ and the right pivot stud $52_2$ may each include an alignment groove 71 which is sized and shaped to accommodate the pivot stud receiver 46 of the right end open jaw bracket 40 and of the left end open jaw bracket 42, respectively.

In an embodiment, a quick disconnect mechanism may be provided wherein the left side mounting bracket 31 and the right side mounting bracket 32 additionally include left and right locking studs, $72_1$ and $72_2$, respectively. The locking studs $72_1$ and $72_2$ are sized and shaped for secure interfitting sliding motion within the arcuate shaped guide slots 60 in the right end open jaw bracket 40 and the left end open jaw bracket 42, respectively.

In an embodiment, the left and right locking studs $72_1$ and $72_2$ may be provided as threaded bolts and thus may be secured to left 31 and right 32 mounting brackets via use of nuts as indicated by fasteners $74_1$ and $74_2$, as seen for example in FIG. 6 showing fastener $74_2$. Likewise, in an embodiment the left and right pivot studs $52_1$ and $52_2$ may be provided as threaded bolts and thus may be secured to left 31 and right 32 mounting brackets via use of nuts as indicated by fasteners $53_1$ and $53_2$, as seen for example in FIG. 6 with respect to fastener $53_1$. In order to maintain radial spacing between the pivot studs $52_1$ and $52_2$ and their adjacent locking studs $72_1$ and $72_2$, respectively, alignment bars $76_1$ and $76_2$ may be provided, as also seen in FIG. 6. Further, as seen in FIGS. 2, 3, and 5, mounting slots $77_1$ in bracket 31 and $77_2$ in bracket 32, as defined by slot edgewalls $77_E$, may be provided to enable adjustment of the location of locking studs $72_1$ and $72_2$ so that alignment of the detachable stair portion 21 between brackets 31 and 32 (in a recreational vehicle doorway) is provided.

As can be appreciated from FIG. 1, in an embodiment, the inside surface $31_I$ of bracket 31 and the inside surface $32_I$ of bracket 32 may be spaced apart by a distance $D_S$. In an embodiment the alignment grooves 71 in the pivot studs $52_1$ and $52_2$ provide for spacing of the right outside surface $40_O$ and a left outside surface $42_O$ of the fixed plates provided by right end open jaw bracket 40 and a left end open jaw bracket 42 away from the inside surface $31_I$ of bracket 31 and the inside surface $32_I$ of bracket 32 by a clearance distance C. In an embodiment, clearance distance C may be larger than zero and up to about one quarter of an inch (¼"). In an embodiment, clearance distance C may be at least one eighth inch (⅛"). Thus, the overall width Wo of the detachable stair portion 21, at least in that portion between brackets 31 and 32, is the combination of the distance $D_S$ less two times the clearance distance C. Thus, in an embodiment, the right outside surface $40_O$ of the right end open jaw bracket 40 and the left outside surface $42_O$ of the left end open jaw bracket 42 (see FIG. 1) are spaced apart by width Wo.

The left locking stud $72_1$ and the right locking stud $72_2$ each have an interior distal end, $72_{1\text{-}E}$ and $72_{2\text{-}E}$ respectively. When the detachable stair system 20 is assembled and installed in a recreational vehicle doorway, the interior distal ends $72_{1\text{-}E}$ and $72_{2\text{-}E}$ of said left locking stud $72_1$ and the right locking stud $72_2$ are spaced apart a distance $D_D$, where $D_D$ is less than the width of the sill cover plate 34 (e.g. at edge 79 as seen in FIGS. 2, 3, and 4) adjacent the arcuate shaped guide slots 60 provided in the right end open jaw bracket 40 and the left end open jaw bracket 42. Importantly, the interior distal ends $72_{1\text{-}E}$ and $72_{2\text{-}E}$ of the left locking stud $72_1$ and of the right locking stud must be sufficiently long that they extend well into, or in an embodiment actually fully occupy the lateral thickness of the right end and left end open jaw brackets 40 and 42 and thus fit fully and snugly in guide slots 60, but are not so long that they extend too far toward each other (i.e. do not extend very far inwardly past—if at all inwardly past—an interior edge $42_I$ of left end open jaw bracket 42 and interior edge $40_I$ of right end open jaw bracket 40), where they would tend to interfere with or prevent rotating passage of the adjacent end 79 of the sill cover plate 34 (see FIG. 2, 3 or 4), when the detachable stair portion 21 is moved from a closed, upward stored position as seen in FIG. 1, to a outwardly and downwardly extended working position as seen in FIG. 12. When so constructed, and a suitable distance is provided between the interior distal ends $72_{1\text{-}E}$ and $72_{2\text{-}E}$ of the left locking stud $72_1$ and of the right locking stud, the detachable stair portion 21, including the sill cover plate 34 and the right end and left end open jaw brackets 40 and 42 are freely pivotable on the left pivot stud $52_1$ and the right pivot stud $52_2$, while the locking studs $72_1$ and $72_2$ snugly fit and move in the arcuate shaped guide slots 60, to rotatably secure the detachable stair portion 21.

Also, in order to enable the detachable stair portion 21 to pivot outward and downward (see FIGS. 11 and 12), and inward and upward when the detachable stair portion 21 is returned to the stored position 30 as seen in FIG. 1, the distance $D_S$ (between the inside edge $31_I$ and $32_I$ and of brackets 31 and 32 respectively) is larger than the distance Wo (the overall width of the detachable stair portion 21 at the outside edge $40_O$ and $42_O$ of right end open jaw and left end open jaw brackets 40 and 42 respectively). Thus, the clearance distances provided enable the detachable stair portion 21, including a quick disconnect upper end assembly with the sill cover plate 34 and the right end and left end open jaw brackets 40 and 42 which are freely pivotable on and between the left pivot stud $52_1$ and the right pivot stud $52_2$.

As more clearly seen in FIGS. 5 and 6, in various embodiments, one or both of the mounting brackets 31 and 32 further include a latch slot 80 defined by slot interior edge walls 82. As seen in FIGS. 2 and 3, the detachable stair system 20 further includes at least one latch 84. In an embodiment, latch 84 may be a slide latch. In an embodiment, latch 84 may include a body 86 having a latch tongue 88 portion sized and shaped for mating engagement with the latch slot 80. An embodiment for suitable structure and operation for latch 84 may be seen in FIGS. 2, 3, 4, and 7. Threaded studs $85_1$ and $85_2$ may be provided on the rear $34_R$ of sill plate 34 portion $34_F$. In an embodiment, the threaded studs $85_1$ and $85_2$ may be used to slidably secure latch 84 to the rear $34_R$ of sill plate 34, using washers $85_W$ and fasteners such as nuts $85_N$.

Figure 7:
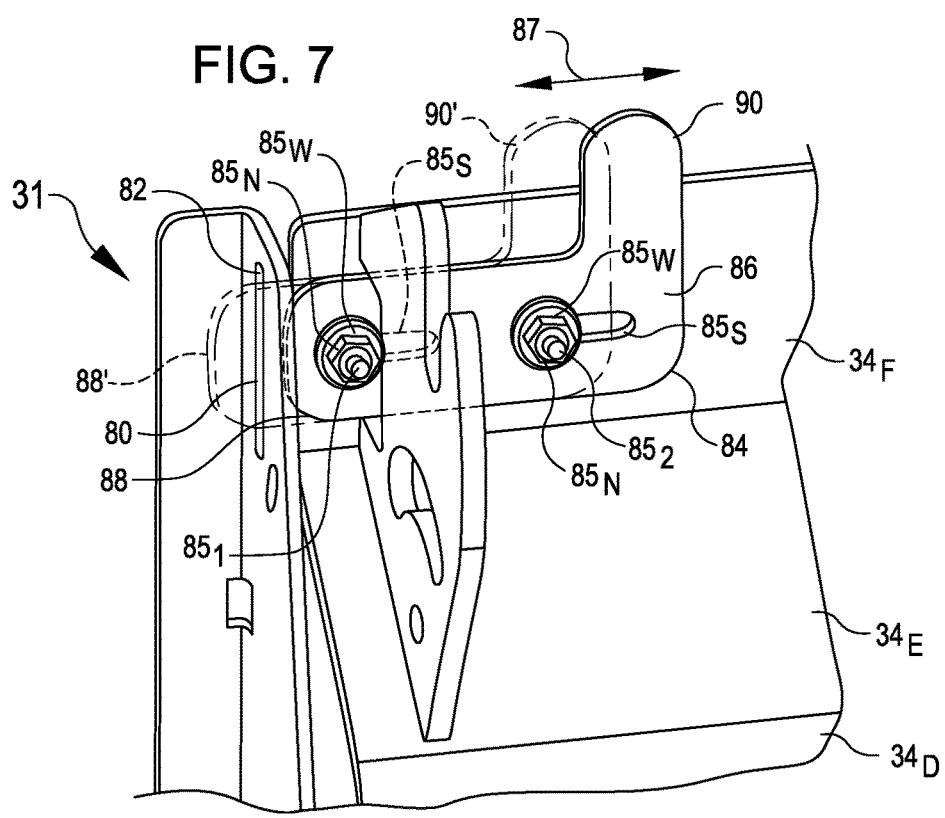
FIG. 7 is a partial perspective view of the backside of the right side mounting bracket and a partial cutaway of the detachable stairs, showing the locking tab receiving slot at the top, and sliding action for locking and unlocking the stairs by having the tab engage and disengage the locking tab receiving slot.

As seen at reference arrow 87 in FIG. 7 (or reference arrow $87_L$ in FIG. 3 and reference arrow $87_U$ in FIG. 2) the latch tongue 88 portion is moveable into or out of the latch slot 80. Elongated slots 85s (which may be oval in shape) are provided through which threaded studs $85_1$ and $85_2$ extend, for maintaining the latch 84 in a working position with respect to latch slot 80. The latch tongue 88 may be insertable into the latch slot 80 (see tongue 88 at the tongue 88' position shown in FIGS. 2 and 7). Thus, the lock the detachable stair portion 21 of the detachable stair portion 21 is retained in place in a rolled up, stored configuration as seen in FIG. 1, and removable from said latch slot 80 to allow the detachable stair portion 21 to be rolled down and out for deployment, as seen in FIG. 12, or for removal, as demonstrated in FIG. 3 (see removal reference arrow 89). In an embodiment, the slide latch 84 may include an ear portion 90 adapted for manual manipulation of the slide latch 84. Accordingly, when the latch is engaged, the brackets 40 and 42 are hooked over and secured against (and to) the left and right pivot studs $52_1$ and $52_2$. Consequently, the brackets 40 and 42 cannot lift off of the left and right pivot studs $52_1$ and $52_2$ when the latch 84 is engaged securely within latch slot 80. However, when the latch 84 is disengaged from latch slot 80, the brackets 40 and 42, and the entire detachable stair portion 21, may be lifted off of the left and right pivot studs $52_1$ and $52_2$ when the detachable stair portion 21 is tilted-up into a stored position as shown in FIG. 1.

Figure 8:
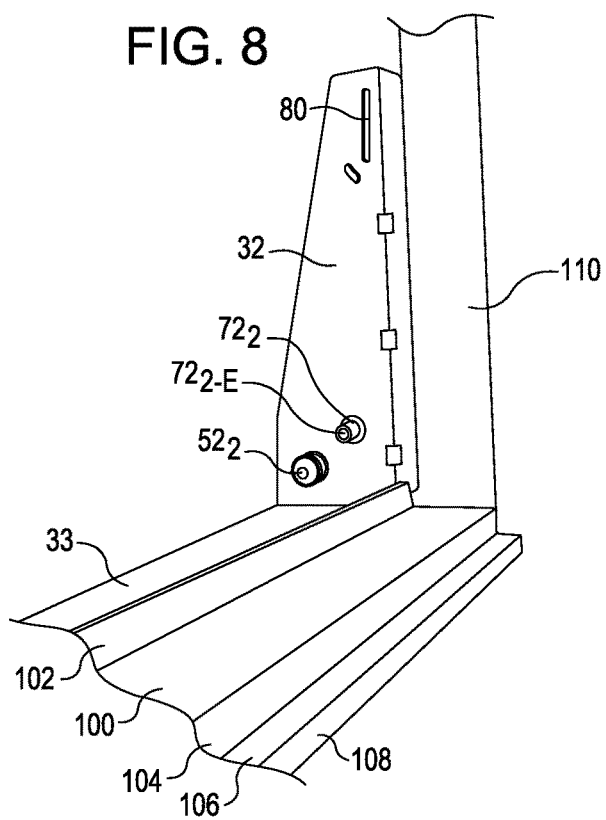
FIG. 8 is a perspective view of the inside of the right side mounting bracket, similar to the view shown in FIG. 5 above, but now showing the mounting bracket installed in the door frame of a recreational vehicle, ready for receiving a detachable stair portion, and utilizing a quick connect bracket system.
Figure 9:
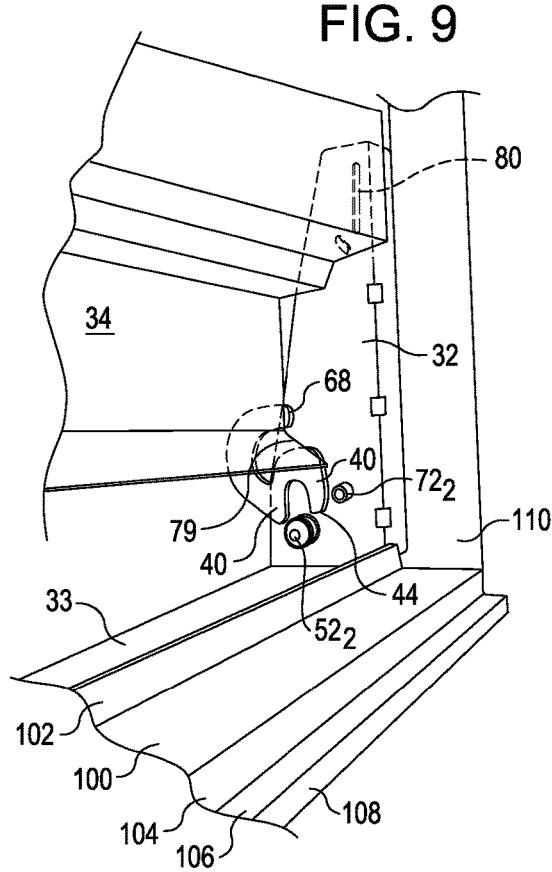
FIG. 9 is a partial perspective view of the right side of the detachable stair system, similar to the view depicted above in FIG. 3, showing the right side mounting bracket with the right end open jaw bracket disengaged from the right side pivot stud, but aligned with and ready to be lowered to the right side pivot stud, so the right end open jaw bracket rests on the pivot stud ready for pivoting action thereon.
Figure 10:
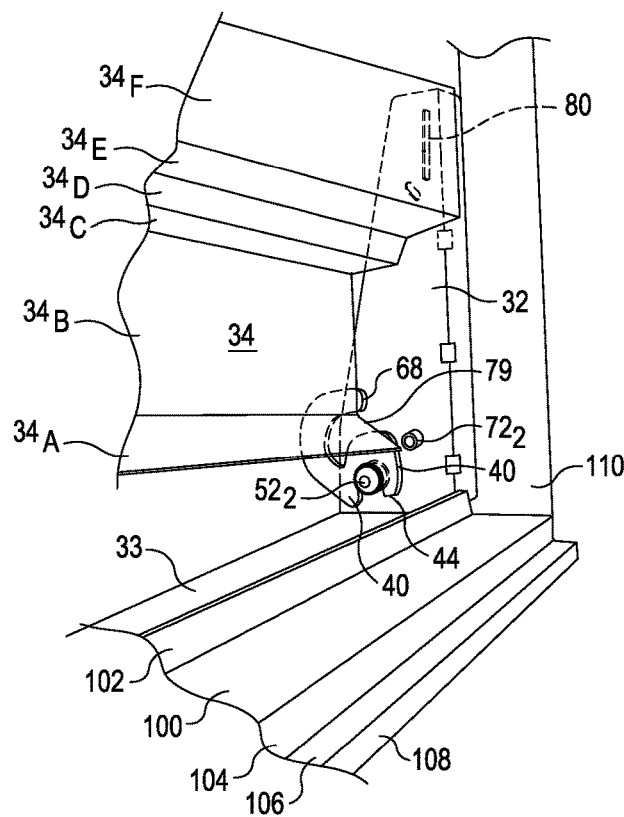
FIG. 10 is a partial perspective view of the right side mounting bracket, similar to the view just depicted in FIG. 9 above, showing the right side mounting bracket in place in a doorway of a recreational vehicle, with the right end open jaw bracket pivotally connected to the and engaged with the right side pivot stud, showing how the right end open jaw bracket is sized and shaped for secure pivotable motion about the right side pivot stud.

Attention is now directed to FIGS. 8, 9, and 10, where a perspective view of the right side mounting bracket 32 is provided, similar to the view shown in FIG. 5 above, but now showing the mounting bracket installed in the door frame of a recreational vehicle, ready for receiving a detachable stair portion 21, utilizing the quick connect bracket and pivot system described herein. Pivot stud $52_2$ and pivot lock $72_2$ are seen in FIGS. 8, 9 and 10, ready to receive right end open jaw bracket 40 (not shown, but see FIG. 9). In an embodiment, the left side mounting bracket 31 and left end open jaw bracket 42 may be provided as mirror images of the configurations illustrated in FIGS. 8, 9, and 10. Floor plate 33 extends between left side mounting bracket 31 and the right side mounting bracket 32. In an embodiment, the floor plate 33 may extend under the left side mounting bracket 31 and under the right side mounting bracket 32. In an embodiment, the left side mounting bracket 31 may include a foot $31_F$ configured to stand on and be supported by, and affixed to the floor plate 33. In an embodiment, the right side mounting bracket 32 may include a foot $32_F$ configured to stand on and be supported by, and affixed to the floor plate 33.

Existing door sill 100, stop 102, and exterior structural features 104, 106, and 108, as well as door 110, are all portions of an existing recreational vehicle in which the detachable stair system 20 is installed. In an embodiment, a suitably shaped sill cover plate 34 may be provided so that when the detachable stair portion 21 is deployed outward and downward, the sill cover plate 34 covers the existing door sill 100, the stop 102, and the exterior structural features 104, 106, and 108, while allowing door 110 to be easily opened and closed.

In FIG. 9 again a partial perspective view of the right side of the detachable stair system, is shown, similar to the view depicted above in FIG. 3, showing the right side mounting bracket 32 with the right end open jaw bracket 40 disengaged from the right side pivot stud $52_2$, but aligned with and ready to be lowered to the pivot stud $52_2$, so the right end open jaw bracket 40 rests on the pivot stud $52_2$ ready for pivoting action thereon.

Then, as shown in FIG. 10, the right side mounting bracket 32 is shown with the right end open jaw bracket 40 resting on the right side pivot stud $52_2$, and aligned with and ready to be locked in place in an upright, position as illustrated in FIG. 1, using latch 84 (not shown in FIG. 10, but see FIG. 7) when lowered to the pivot stud $52_2$, so the right end open jaw bracket 40 rests on the pivot stud $52_2$ ready for pivoting action thereon.

Figure 11:
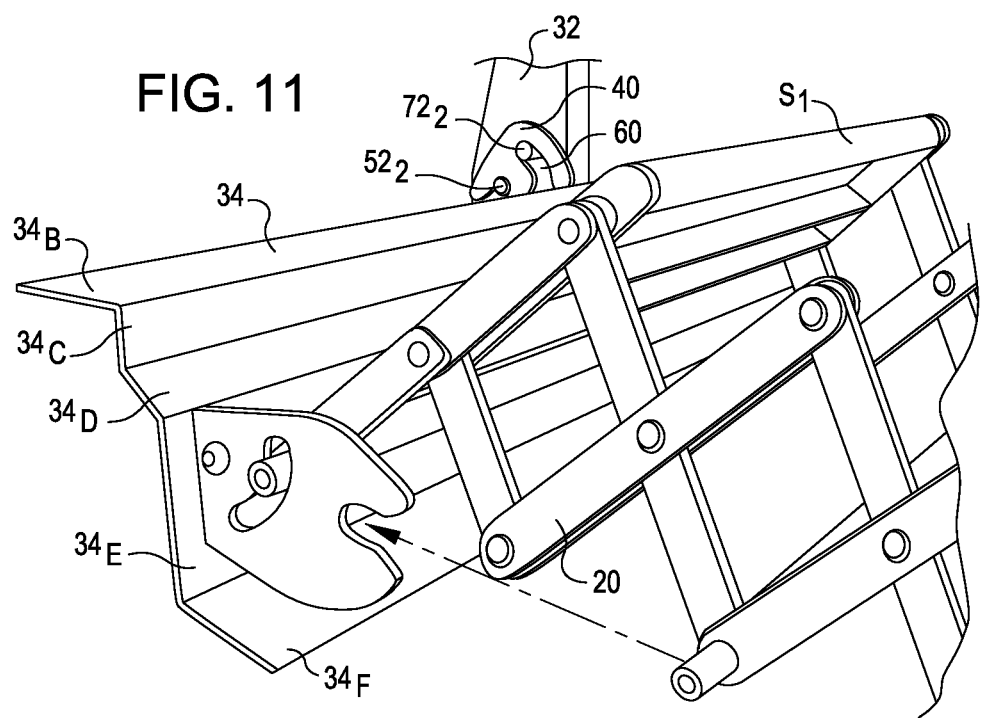
FIG. 11 is a perspective view of the right side mounting bracket, with the detachable stair system with quick disconnect mounted for use, showing the sill cover plate in a substantially horizontal position, ready for extension of stairs outward and downward for use.

As seen in FIGS. 11 and 12, a detachable stair system may be conveniently deployed for use on a vehicle, using an extensible-retractable scissors stair assembly RSA, which may include a first scissors assembly on the left side L and a second scissors assembly on the right side R, as is visible in FIG. 12. In various embodiments, the first scissors assembly and said second scissors assembly each includes a plurality of outward elements and a plurality of downward elements, and wherein the first scissors assembly and the second scissors assembly are spaced apart by a number N of stairs S in a series of stairs $S_1$ to $S_N$, wherein N is a positive integer. In an embodiment, N may be between two (2) and six (6) inclusive. Each of the stairs S should be securely affixed between selected elements of the first scissors assembly and the second scissors assembly. In various embodiments, one or more of the stairs S, or each of the stairs S in a series of stairs $S_1$ to $S_N$ may further include an upper surface having a non-skid surface portion. In various embodiments, the materials used and the structural elements provided enable the provision of a detachable stair portion 21 which is removable by a single adult human individual without the use of a helper, or lifts or tools. As an example, it has been found that when the number N of stairs S in a series of stairs $S_1$ to $S_N$ is three, a three step system may be provided having a weight of about forty two (42) pounds. When the number N of stairs S in a series of stairs $S_1$ to $S_N$ is four, a four step system may be provided having a weight of about forty eight (48) pounds. When the number N of stairs S in a series of stairs $S_1$ to $S_N$ is five, a five step system may be provided having a weight of about fifty five (55) pounds. When the number N of stairs S in a series of stairs $S_1$ to $S_N$ is six, a six step system may be provided having a weight of about sixty one (61) pounds.

It is to be appreciated that the quick disconnect system for a detachable stair system which may be mounted in the doorway of a vehicle as disclosed herein is an appreciable improvement in the art of stairs for recreational vehicles. The novel design for a quick disconnect mechanism for a detachable stair system with precision elevation control addresses the problem of how to conveniently detach and store a stair system for recreational vehicles, while providing a way to eliminate or minimize space occupied by stairs during those times when stairs are not required. The embodiments have been thoroughly described to enable those of ordinary skill in the art to make and use the invention. Further, embodiments which utilize aircraft grade aluminum components, and stainless steel components are provided, for corrosion resistance during years of outdoor use, such as on various camp trailers or on pickup camper designs.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the quick disconnect system for a detachable stair system may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A detachable stair system for a vehicle, comprising:
a sill cover plate, the sill cover plate comprising a right end and a left end;
a right end open jaw bracket and a left end open jaw bracket, the right end open jaw bracket affixed to the right end of the sill cover plate, and the left end open jaw bracket affixed to the left end of said sill cover plate;
a left mounting bracket and a right mounting bracket, and wherein the left and right mounting brackets further comprise a left pivot stud and a right pivot stud, respectively;
a detachable stair portion, the detachable stair portion operably affixed to the sill cover plate and configured for extension and pivotable movement between an open, deployed position and a compressed, stowed position;
wherein the right end open jaw bracket and the left end open jaw bracket are sized and shaped for engagement with and pivoting movement about said left pivot stud and said right pivot stud, respectively; and
an extensible-retractable scissors stair assembly, said extensible-retractable scissors stair assembly comprising a first scissors assembly and a second scissors assembly.

2. A detachable stair system as set forth in claim 1, wherein at least one of the left and right mounting brackets further comprises a latch slot defined by slot interior edge walls; and
further comprising at least one slide latch, said at least one slide latch comprising a body having a latch tongue portion sized and shaped for locking engagement with said latch slot, said latch tongue portion moveable into or out of said latch slot, and insertable into said latch slot to lock said detachable stair portion in place when in a rolled up, stored configuration, and removable from said latch slot to allow the detachable stair portion to be rolled down and out for deployment.

3. A detachable stair system for a vehicle as set forth in claim 1, wherein said first scissors assembly and said second scissors assembly each comprises a plurality of outward elements and a plurality of downward elements, and wherein said first scissors assembly and said second scissors assembly are spaced apart by a number N of stairs S in a series of stairs $S_1$ to $S_N$, wherein N is a positive integer between two (2) and six (6) inclusive, and wherein each of said stairs S is securely affixed between selected outward elements of said first scissors assembly and said second scissors assembly.

4. A detachable stair system for a vehicle as set forth in claim 3, wherein each stair S in said series of stairs $S_1$ to $S_N$ further comprises an upper surface, and wherein said upper surface further comprises a non-skid surface portion.

5. A detachable stair system as set forth in claim 1, further comprising a support, the support comprising:
a left mounting bracket;
a right mounting bracket; and
a floor plate, the floor plate extending between the left mounting bracket and the right mounting bracket;
wherein the floor plate and the left mounting bracket and the right mounting bracket are affixed to provide a one piece structure.

6. A detachable stair system as set forth in claim 5, wherein the left and right mounting brackets each further comprise a pivot stud.

7. A detachable stair system as set forth in claim 6, wherein the left and right mounting brackets each further comprise a locking stud.

8. A detachable stair system as set forth in claim 7, wherein each of the left and right mounting brackets further comprise an adjustment slot location for the locking stud.

9. A detachable stair system as set forth in claim 8, wherein each of the left and right mounting brackets further comprise an adjustment slot suitable for adjustable location of the pivot stud.

10. A detachable stair system as set forth in claim 9, wherein each of the left and right mounting brackets are sized and shaped to securely space apart the locking stud and the pivot stud.

11. A detachable stair system as set forth in claim 10, further comprising fasteners for each of the pivot studs and for each of the locking studs, wherein the fasteners are positionable by the mounting brackets and are adjustable with respect to locations defined by the size and shape of the adjustment slots for the locking studs, to secure the pivot studs and the locking studs at an aligned position for movement outward and downward, and for movement inward and upward, of a detachable stair portion.

\* \* \* \* \*